US011766676B2

(12) United States Patent
King et al.

(10) Patent No.: US 11,766,676 B2
(45) Date of Patent: Sep. 26, 2023

(54) EMULSIFICATION SYSTEM

(71) Applicant: COZZINI LLC, Elk Grove Village, IL (US)

(72) Inventors: Edwin Earl King, Lombard, IL (US); Michael E. Burns, Palatine, IL (US)

(73) Assignee: COZZINI LLC, Elk Grove Village, IL (US)

( * ) Notice: Subject to any disclaimer, the term of this patent is extended or adjusted under 35 U.S.C. 154(b) by 0 days.

(21) Appl. No.: 17/568,996

(22) Filed: Jan. 5, 2022

(65) Prior Publication Data

US 2022/0126302 A1     Apr. 28, 2022

Related U.S. Application Data

(60) Division of application No. 16/820,182, filed on Mar. 16, 2020, now Pat. No. 11,278,909, which is a
(Continued)

(51) Int. Cl.
*B02C 18/30* (2006.01)
*B02C 18/14* (2006.01)
(Continued)

(52) U.S. Cl.
CPC ............ *B02C 18/30* (2013.01); *B02C 18/146* (2013.01); *B02C 18/301* (2013.01);
(Continued)

(58) Field of Classification Search
CPC ..... B02C 18/30; B02C 18/146; B02C 18/301; B02C 18/304; B02C 18/362;
(Continued)

(56) References Cited

U.S. PATENT DOCUMENTS 1,695,898 A    12/1928  Laemmel
1,727,753 A     9/1929  De Bethune
(Continued)

FOREIGN PATENT DOCUMENTS

CH         142426     9/1930
CH         367729     2/1963
(Continued)

OTHER PUBLICATIONS

English translation of Office Action issued in Appl. No. CN201910405733.6 (Nov. 18, 2022).
(Continued)

*Primary Examiner* — Ryan J. Walters
*Assistant Examiner* — Christine Bersabal
(74) *Attorney, Agent, or Firm* — Barnes & Thornburg LLP

(57) ABSTRACT

An emulsion system is provided. The system includes a shaft that supports a plurality of cutting assemblies and screens in alternating order, wherein the cutting assembly rotates with respect to an in close proximity to the screen. The cutting assemblies include a plurality of cutting elements that extend radially outward from a hub and are positioned at consistent radial spacing along the perimeter of the hub. Each cutting element includes front and back edges that cut food particles in conjunction with holes within the screen, wherein the front and back edges are substantially perpendicular.

4 Claims, 13 Drawing Sheets

Related U.S. Application Data continuation of application No. PCT/US2019/047889, filed on Aug. 23, 2019.

(60) Provisional application No. 62/819,961, filed on Mar. 18, 2019.

(51) Int. Cl.
  *B02C 23/16*  (2006.01)
  *B02C 23/14*  (2006.01)
  *B02C 18/36*  (2006.01)
  *B23P 19/04*  (2006.01)

(52) U.S. Cl.
  CPC .......... *B02C 18/304* (2013.01); *B02C 18/362* (2013.01); *B02C 18/365* (2013.01); *B02C 23/14* (2013.01); *B02C 23/16* (2013.01); *B23P 19/04* (2013.01); *B02C 18/141* (2013.01); *B02C 2018/147* (2013.01); *B02C 2023/165* (2013.01)

(58) Field of Classification Search
  CPC ..... B02C 18/365; B02C 18/141; B02C 23/14; B02C 2018/147; B02C 2023/165; B02C 23/16; B23P 19/04; A22C 17/0026
  See application file for complete search history.

(56) References Cited

U.S. PATENT DOCUMENTS

| | | | |
|---|---|---|---|
| 2,625,846 A | 1/1953 | Hess | |
| 2,851,256 A * | 9/1958 | Andreopoulos | B01F 27/2721 241/285.3 |
| 3,286,551 A | 11/1966 | Tipton | |
| 3,471,800 A | 10/1969 | Congleton et al. | |
| 3,542,104 A | 11/1970 | Anderson | |
| 3,936,005 A | 2/1976 | Schnell | |
| 3,976,252 A | 8/1976 | PerDue | |
| 4,023,253 A | 5/1977 | Funakubo | |
| 4,029,149 A | 8/1977 | Gajdos | |
| 4,039,149 A | 8/1977 | Gajdos | |
| D336,882 S | 6/1993 | Steinke et al. | |
| 6,007,007 A | 12/1999 | Haack et al. | |
| 6,502,980 B1 | 1/2003 | Ekstrom et al. | |
| 7,540,440 B2 | 6/2009 | Lesar et al. | |
| 7,628,345 B2 | 12/2009 | Handtmann et al. | |
| 7,905,436 B2 | 3/2011 | Lesar et al. | |
| D678,725 S | 3/2013 | Sayers et al. | |
| D680,373 S | 4/2013 | Haggerty et al. | |
| 8,690,092 B2 | 4/2014 | Jenkins | |
| D746,344 S | 12/2015 | Truty | |
| D847,882 S | 5/2019 | King | |
| D849,807 S | 5/2019 | King | |
| 10,363,563 B2 | 7/2019 | Norberg | |
| 10,682,650 B2 | 6/2020 | Joechner | |
| D904,473 S | 12/2020 | King et al. | |
| 2001/0052558 A1 | 12/2001 | Younker | |
| 2002/0084368 A1 | 7/2002 | Bernhardt | |
| 2004/0108281 A1 | 6/2004 | Gerteis et al. | |
| 2009/0026295 A1 | 1/2009 | Mathiebe | |
| 2010/0282887 A1 | 11/2010 | Walters | |
| 2011/0248105 A1 | 10/2011 | Braig | |
| 2012/0261501 A1 | 10/2012 | Walther | |
| 2013/0062445 A1 | 3/2013 | Wolff | |
| 2013/0099036 A1 | 4/2013 | Wolff | |
| 2013/0164425 A1 | 6/2013 | Wolff | |
| 2013/0284835 A1 | 10/2013 | Quadrana | |
| 2014/0252143 A1 | 9/2014 | Wight | |
| 2015/0196039 A1 | 7/2015 | Wolff | |
| 2015/0283777 A1 | 10/2015 | Dendel et al. | |
| 2016/0051990 A1 | 2/2016 | Joechner | |
| 2016/0228880 A1 | 8/2016 | Norberg | |
| 2017/0266717 A1 * | 9/2017 | Cassinath | B22D 1/002 |
| 2020/0298249 A1 | 9/2020 | King et al. | |

FOREIGN PATENT DOCUMENTS

| | | |
|---|---|---|
| CN | 1520338 | 8/2004 |
| CN | 203990806 U | 12/2014 |
| CN | 106070507 | 11/2016 |
| DE | 29905708 U1 | 7/1999 |
| DE | 19908665 | 1/2001 |
| GB | 1385970 | 3/1975 |
| WO | 2015/140673 | 9/2015 |
| WO | 2018/011726 | 1/2018 |

OTHER PUBLICATIONS

Extended European Search Report dated Aug. 7, 2019 for EP19174035.6.

Extended European Search Report issued in Appl. No. EP22190029.3 (dated May 22, 2023).

* cited by examiner

EMULSIFICATION SYSTEM

CROSS-REFERENCE TO RELATED APPLICATIONS

This application is a divisional of U.S. patent application Ser. No. 16/820,182, filed Mar. 16, 2020, which is a non-provisional application that claims priority to U.S. provisional application Ser. No. 62/819,961, filed Mar. 18, 2019, and is a continuation of PCT/US2019/047889, filed Aug. 23, 2019, each of which is incorporated by reference herein in its entirety.

TECHNICAL FIELD

The subject application relates to an emulsification system that is provided to emulsify or grind food product into small pieces or a slurry in the presence of a vacuum to pull food through multiple screens, and in the presence of multiple rotating cutting assemblies that cut the food particles into smaller and smaller sizes as the food product is pulled through the screens. Often, such as in pet food applications where a percentage of bone is allowed in a mixture with meat to be processed, the holes of the screens become blocked, which leads to frequent downtime to clean the components of the machine. The disclosed device is intended to prevent these and other problems known with conventional emulsification devices.

BRIEF SUMMARY

A first representative embodiment of the disclosure includes a method of assembling an emulsification system. The method comprises the steps of placing a plurality of screens and a plurality of cutting assemblies upon a shaft and within a housing, wherein the plurality of screens and the plurality of cutting assemblies are disposed upon the shaft such that each screen of the plurality of screens alternates with each cutting assembly of the plurality of cutting assembly, wherein a first cutting assembly is disposed upon a shaft such that it is closest to a distal end of the shaft, wherein the plurality of screens are each fixed with respect to the housing such that the screens do not rotate with rotation of the shaft, and wherein the plurality of cutting assemblies are fixed to the shaft such the cutting assemblies rotate with rotation of the shaft and with respect to the plurality of screens, wherein the plurality of screens and plurality of cutting assemblies are each longitudinally movable along the shaft. Each of the plurality of cutting assemblies include a central hub, a plurality of cutting elements that extend radially outward from the hub and are spaced with a consistent angular spacing from adjacent cutting elements around the a perimeter of the hub, and wherein the screen includes opposite first and second side surfaces and a plurality of holes that extend therethrough. Each of the cutting elements comprise first and second parallel side surfaces and first and second parallel end surfaces, wherein edges are formed where each of the first and second side surfaces meet the first and second end surfaces, wherein each of the edges are substantially perpendicular between the respective side and end surface defining the edge. The method further comprises the step of placing a collar upon the shaft and in proximity to a hub of the first cutting assembly. The method further comprises the step of rotating a nut upon a threaded portion at the distal end of the shaft in a first direction until an end surface of the nut contacts a second end surface of the collar. The method further comprises the step of continuing to thread the nut in the first direction to slide the collar until a first surface of the collar opposite from the second surface contacts the hub of the first cutting assembly, and continuing to thread the nut in the first direction until further rotation is prevented, wherein a side surface of one or more of the cutting elements upon each cutting assembly contacts the respective first or second side surface of the screen that faces the respective cutting assembly. The method further comprises the step of rotating the nut in a second direction opposite to the first direction a distance to back the nut away from the second surface a distance between about 0.002 and 0.018 inches from the second surface of the collar.

Another representative embodiment of the disclosure is provided. The embodiment includes an emulsification system. The system includes a shaft capable of rotation, and a housing that encloses the shaft. A plurality of screens are disposed about the shaft and within the housing, each of the plurality of screens are fixed with respect to the housing and remain stationary as the shaft rotates, each screen has a plurality of thru holes to allow a food product to pass therethrough. A plurality of cutting assemblies are disposed about the shaft and within the housing, the plurality of cutting assemblies fixed to the shaft such that the each cutting assembly rotates with rotation of the shaft. The cutting assemblies and screens are arranged upon the shaft in an alternating order, with a cutting assembly disposed first upon the shaft in a position closest to a distal end of the shaft, then a screen, then a cutting assembly, and then a screen, wherein each of the cutting assemblies and the screens are disposed in very close proximity to the adjacent respective screen or cutting assembly without intended direct contact between adjacent screens and cutting assemblies. Each of the plurality of cutting assemblies comprises a central hub and a plurality of cutting elements that extend radially outward from the hub, and wherein each of the plurality of cutting elements extend from the hub such that they are spaced with a consistent spacing from neighboring cutting elements around a perimeter of the hub. Each of the cutting elements comprise first and second end surfaces that are parallel to each other and first and second width surfaces that are parallel with each other, wherein a first edge is formed where the first end surface intersects with the first width surface, and a second edge is formed wherein the second end surface intersects with the first width surface. The first and second edges are substantially perpendicular edges.

Yet another representative embodiment of the disclosure is provided. The embodiment includes an emulsification system. The system includes a shaft capable of rotation, and a housing that encloses the shaft. A plurality of screens are disposed about the shaft and within the housing, each of the plurality of screens are fixed with respect to the housing and remain stationary as the shaft rotates, each screen has a plurality of thru holes to allow a food product to pass therethrough. A plurality of cutting assemblies are disposed about the shaft and within the housing, the plurality of cutting assemblies fixed to the shaft such that the each cutting assembly rotates with rotation of the shaft. The cutting assemblies and screens are arranged upon the shaft in an alternating order, with a cutting assembly disposed first upon the shaft in a position closest to a distal end of the shaft, then a screen, then a cutting assembly, and then a screen, wherein each of the cutting assemblies and the screens are disposed in very close proximity to the adjacent respective screen or cutting assembly without intended direct contact between adjacent screens and cutting assemblies. Each of the plurality of cutting assemblies comprises a central hub and a plurality of cutting elements that extend radially outward from the hub, and wherein each of the plurality of cutting elements extend from the hub such that they are spaced with a consistent spacing from neighboring cutting elements around a perimeter of the hub. Each of the cutting elements comprise first and second end surfaces that are parallel to each other and first and second width surfaces that are parallel with each other, wherein a first edge is formed where the first end surface intersects with the first width surface, and a second edge is formed wherein the second end surface intersects with the first width surface. The nut comprises a plurality of recesses disposed about an outer surface thereof proximate to a first end surface, wherein the first end surface of the nut faces the collar when the system is assembled. The collar comprises a first end surface that when assembled faces the hub of the first cutting assembly and an opposite second surface, wherein the collar further comprises a pin that is biased to extend outwardly past the second surface of the collar, and can be urged to withdraw within the collar such that the pin no longer extends past the second surface, wherein the pin is configured to extend within a recess of the plurality of recesses within the nut that is disposed proximate to the second surface of the collar and in a rotational position with respect to the shaft such that the pin is in registry with the recess.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS

Figure 1:
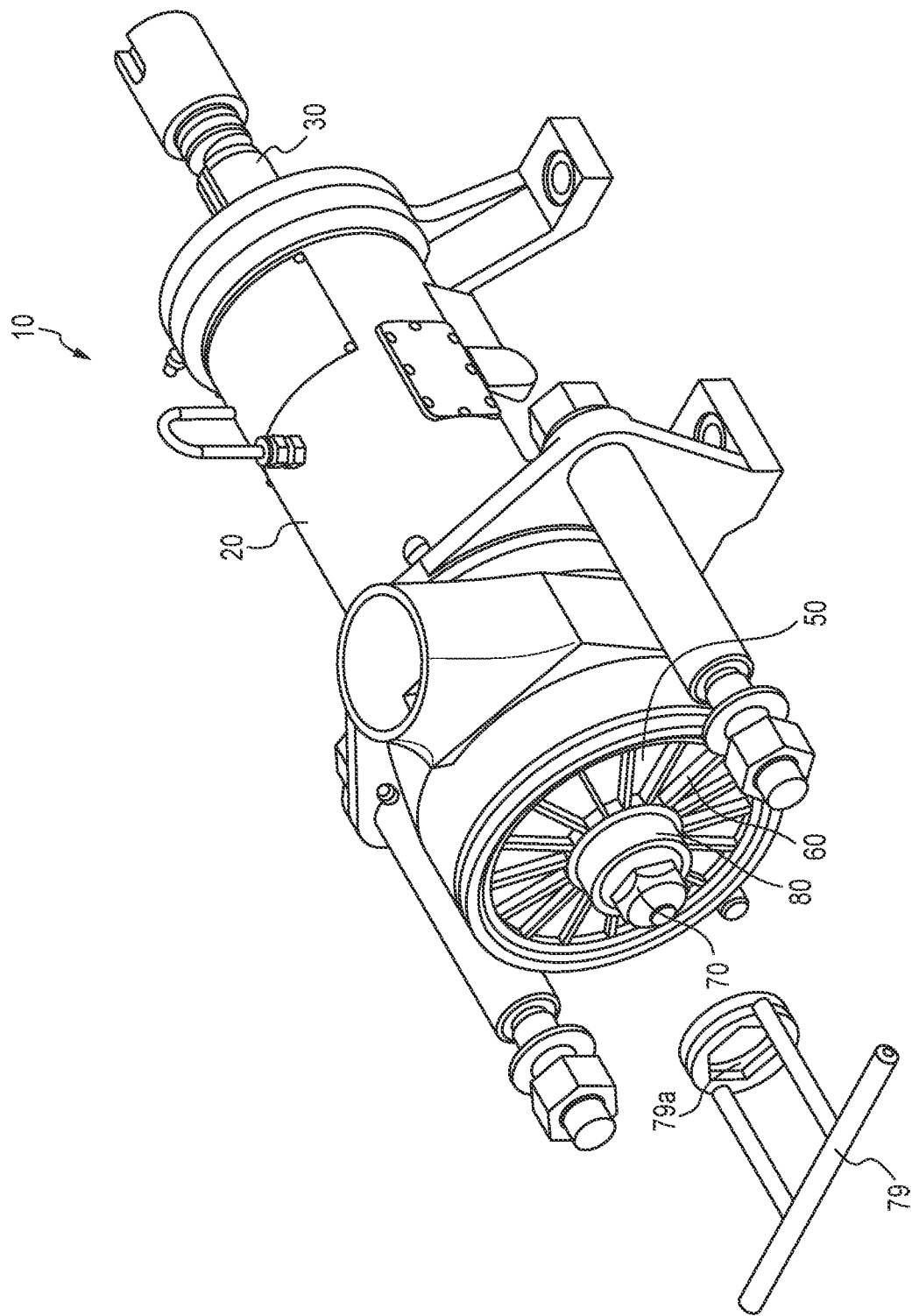
FIG. 1 is a perspective view of an emulsion device.
Figure 2:
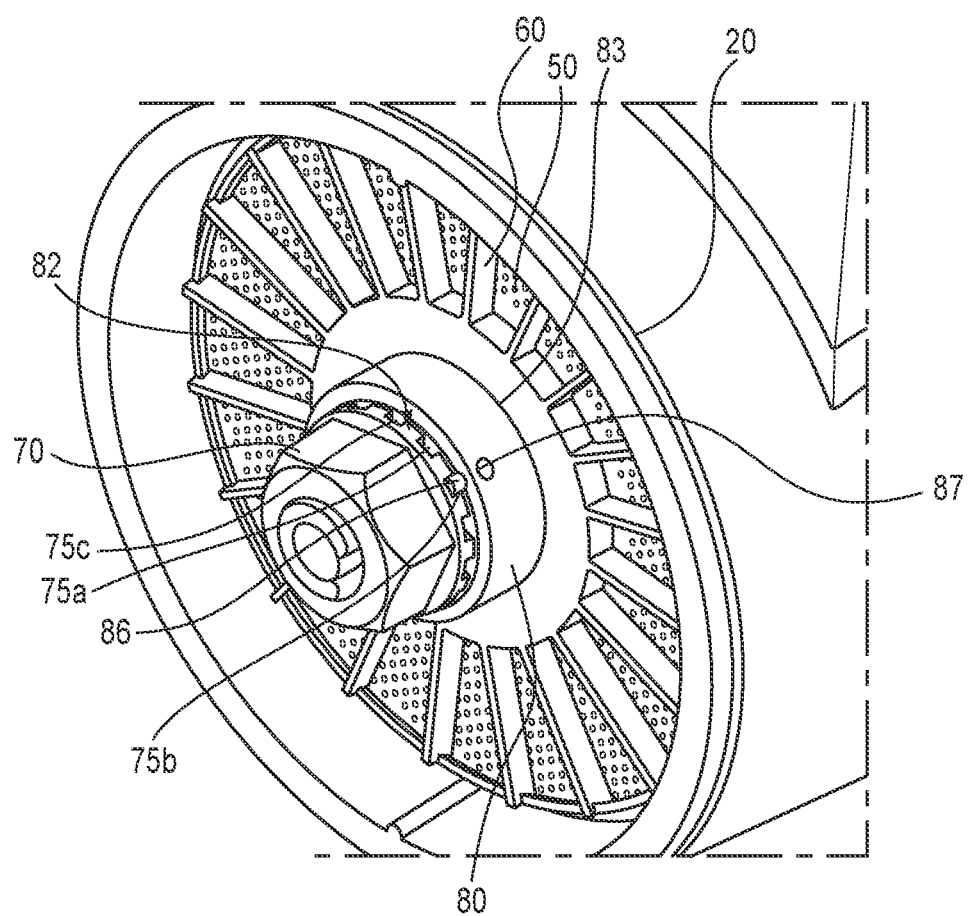
FIG. 2 is a perspective view of a distal end portion of the emulsion device, depicting the first cutting assembly and the first screen of an emulsion assembly disposed within the housing of the device.
Figure 3:
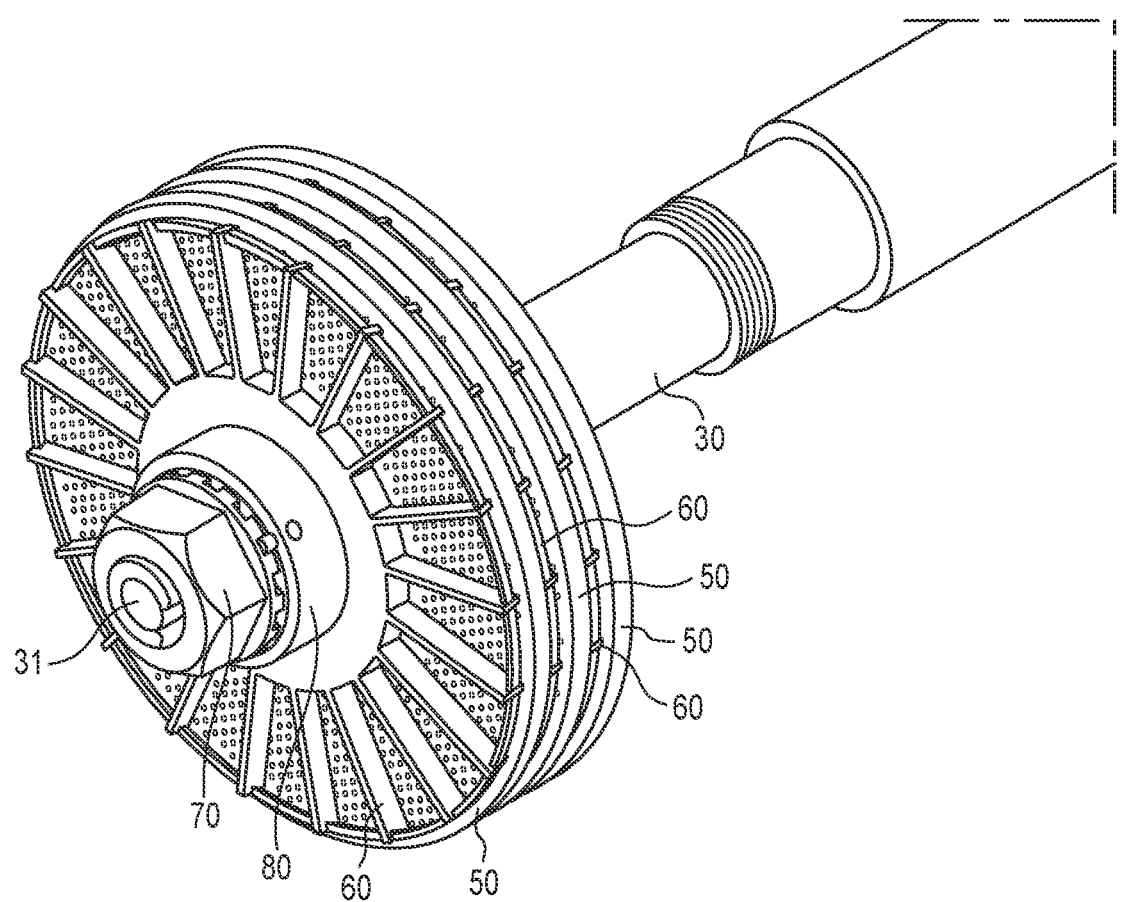
FIG. 3 is the view of FIG. 2 with the housing removed.

Turning now to FIGS. 1-13, an emulsion or grinding device 10 is provided. The emulsion device 10 is configured to accept a flow of relatively large sized food product, such as meat. In some embodiments, the device 10 is used to prepare emulsions of food products that are intended for human consumption where generally bones are removed before the grinding or emulsification process, while in other embodiments the device 10 is used to prepare emulsions of food products that are intended for pet food, where a certain percentage or size of final bone material is allowed within a saleable food unit. Emulsions that are prepared by the device may be used in saleable food products such as hot dogs, sausage, pet foods, and the like. Emulsions may also be prepared that are not intended for commercial sale to an end consumer, but are used in animal feed or for other uses.

The disclosed device may be beneficial over conventional emulsion devices for various reasons, such as allowing for larger holes within screens still obtaining a desired maximum food product or bone size (pet food applications), to prevent premature wear of the components of the device as normally evidenced in conventional emulsion systems, prevent bones or food products from being stuck within holes in the screens of the emulsion device, which would reduce flow rate through the device and establish localized low flow zones within the device which could introduce clogging, resistance to the rotating components or other problems known in conventional systems.

In some embodiments the device 10 includes a shaft 30 that is disposed within a housing 20. The shaft 30 supports a plurality of cutting assemblies 60 that are disposed in an alternating and arrangement with a plurality of screens 50. In some embodiments, the elements may be arranged (away from the distal end 31 of the shaft and toward the outlet 8 of the housing)—cutting assembly 60, screen 50, cutting assembly 60, screen 50, cutting assembly 60, screen. In other embodiments, two cutting assemblies and screens may be provided in the same order, on other embodiments three cutting assemblies may be provided with two screens disposed between the three cutting assemblies.

As discussed in further detail below, the cutting assemblies 60 rotate with rotation of the shaft 30, while the screens 50 are fixed with respect to the housing. The housing 20 may be connected to a vacuum or other source of suction at an output 8 of the housing, which pulls the food product through the holes 54 within the plurality of screens 50, and in the presence of rotating cutting assemblies 60, which shear the food product in smaller and smaller sizes as depicted schematically as elements A, B, C in FIGS. 12 and 13. Alternatively, product can be pumped through the housing and the screens and rotating cutting assemblies with the higher inlet pressure urging the food product therethrough. The plurality of cutting assemblies 60 and screens 60 are disposed upon the shaft 30 and maintained in position with a collar 80 that rotates along with the shaft 30, and a nut 70 may be provided to maintain the collar 80 in position.

Figure 5:
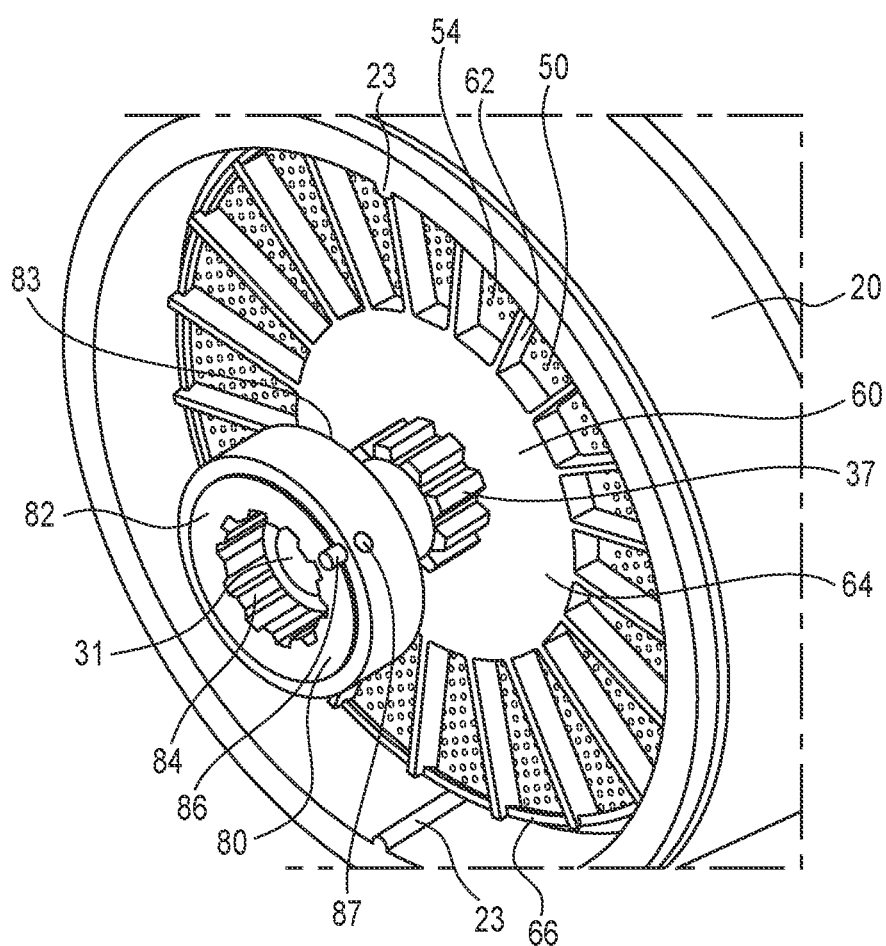
FIG. 5 is the view of FIG. 2 depicting with the nut removed and the collar exploded from the shaft.
Figure 6:
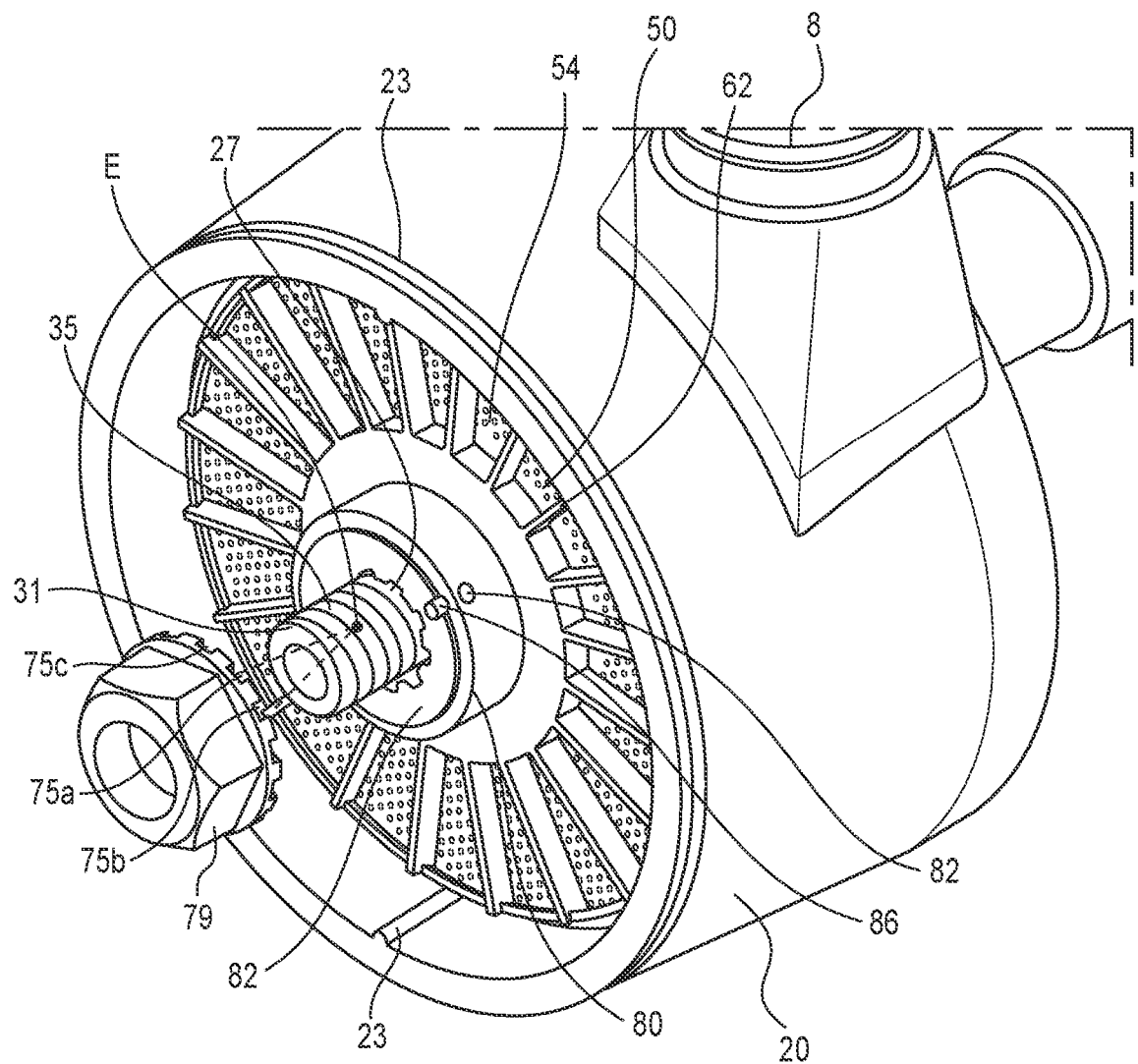
FIG. 6 is the view of FIG. 5 with the nut exploded from the shaft and the collar in position upon the shaft proximate to or in contact with the first cutting assembly.
Figure 7:
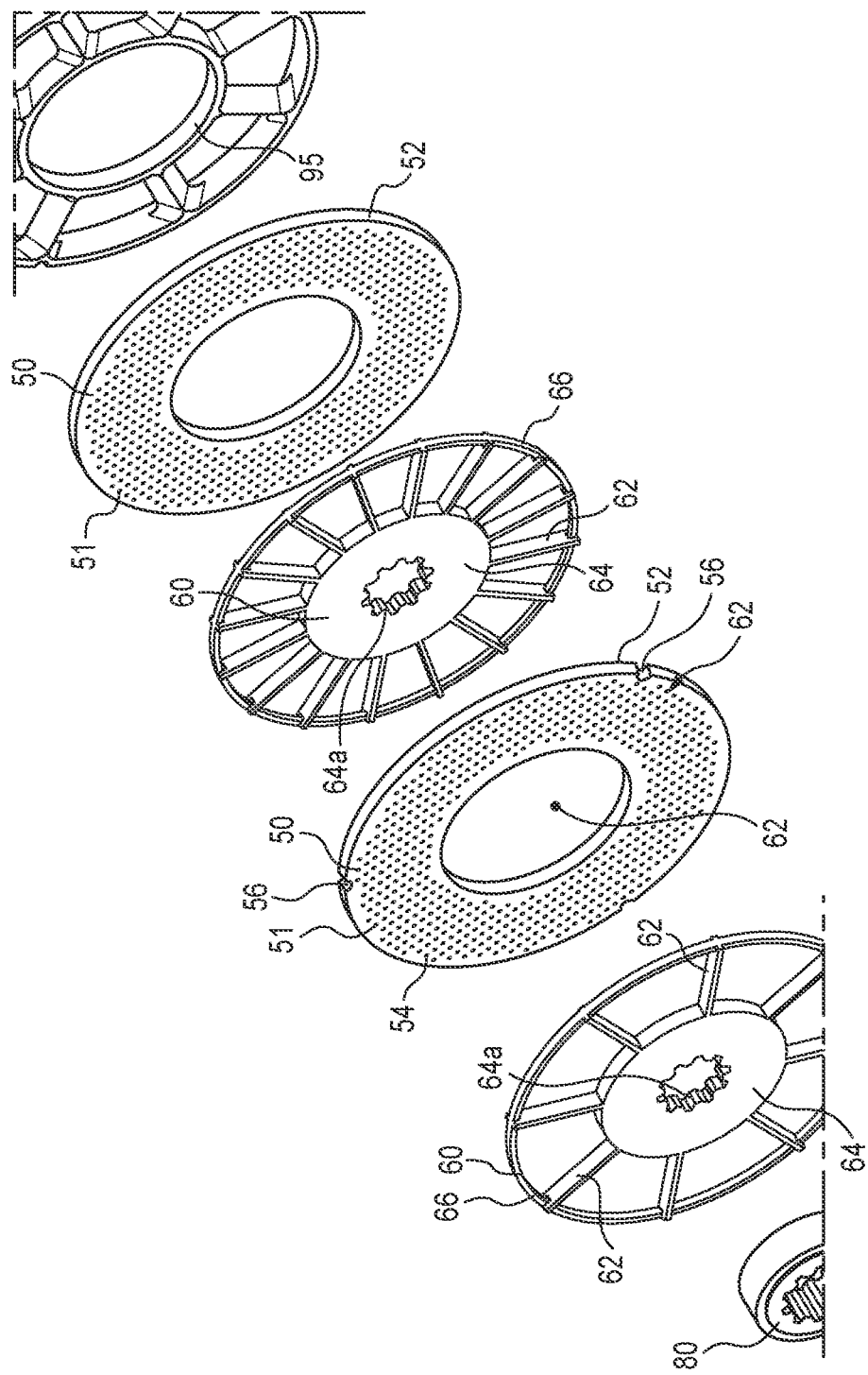
FIG. 7 is a detail view of the view of FIG. 4, depicting an assembly with two cutting assemblies and two screens.

The screens 50 are best shown in FIGS. 5 and 7. In some embodiments, a plurality of screens 50 are provided upon the shaft 30 such that a food product must pass through holes 54 in multiple screens in order to pass the assembly and be pulled out of the housing 8. In some embodiments, each successive screen 50 is the same component, i.e. with the same number of holes 54, the same spacing and pattern of holes 54, and with the same diameter of holes 54. In other embodiments, a first screen 50 may have holes with a first diameter, spacing, etc. while successive screens 50 (which the food product would reach after passing through a hole in the first screen) may have holes with a smaller diameter, larger spacing between adjacent holes, a different hole pattern, all by way of example. The screen 50 may include a first surface 51 that faces toward the inlet of the housing (or the distal end 31 of the shaft 30) and an opposite second surface 52 that faces toward the outlet 8 of the housing. In some embodiments, all or some holes 54 in all or some screens may by cylindrical, while in other embodiments, one or more screens 50 may have truncated conical holes 54, where the truncated end resides through the first surface 51 and the larger diameter end extends through the second surface 52. In some embodiments, the each screen 50 may have holes 54 with the same diameter, while in other embodiments, screens 50 may have holes of different diameter, such as an increasing diameter as the holes extend radially outward from a center portion of the screen.

The screens 50 may include a central opening 53, which is configured to allow the shaft 30 and the spline 37 to extend therethrough, which allows the shaft 30 to rotate with the screen 50 maintaining fixed in the rotational direction. The diameter of the central opening 53 may be larger than the diameter of the spline 37 to allow relative rotation of the shaft 30 with respect to the screens 50.

As discussed below, the screens 50 may be longitudinally moveable within the housing 20 toward and away from the distal end 31 of the shaft 30. In some embodiments, the screens 50 may be keyed to the housing 20, such as with a plurality of recesses 56 that are disposed within an outer edge 52 that key with corresponding projections 23 in the housing (FIGS. 5 and 6), which serve to rotational fix the screens 50 with respect to the housing 20, but allow the screens 50 to move longitudinally along the housing 20. Alternatively, the screens 50 may include one or more projections that key within recesses within the housing 20.

Figure 4:
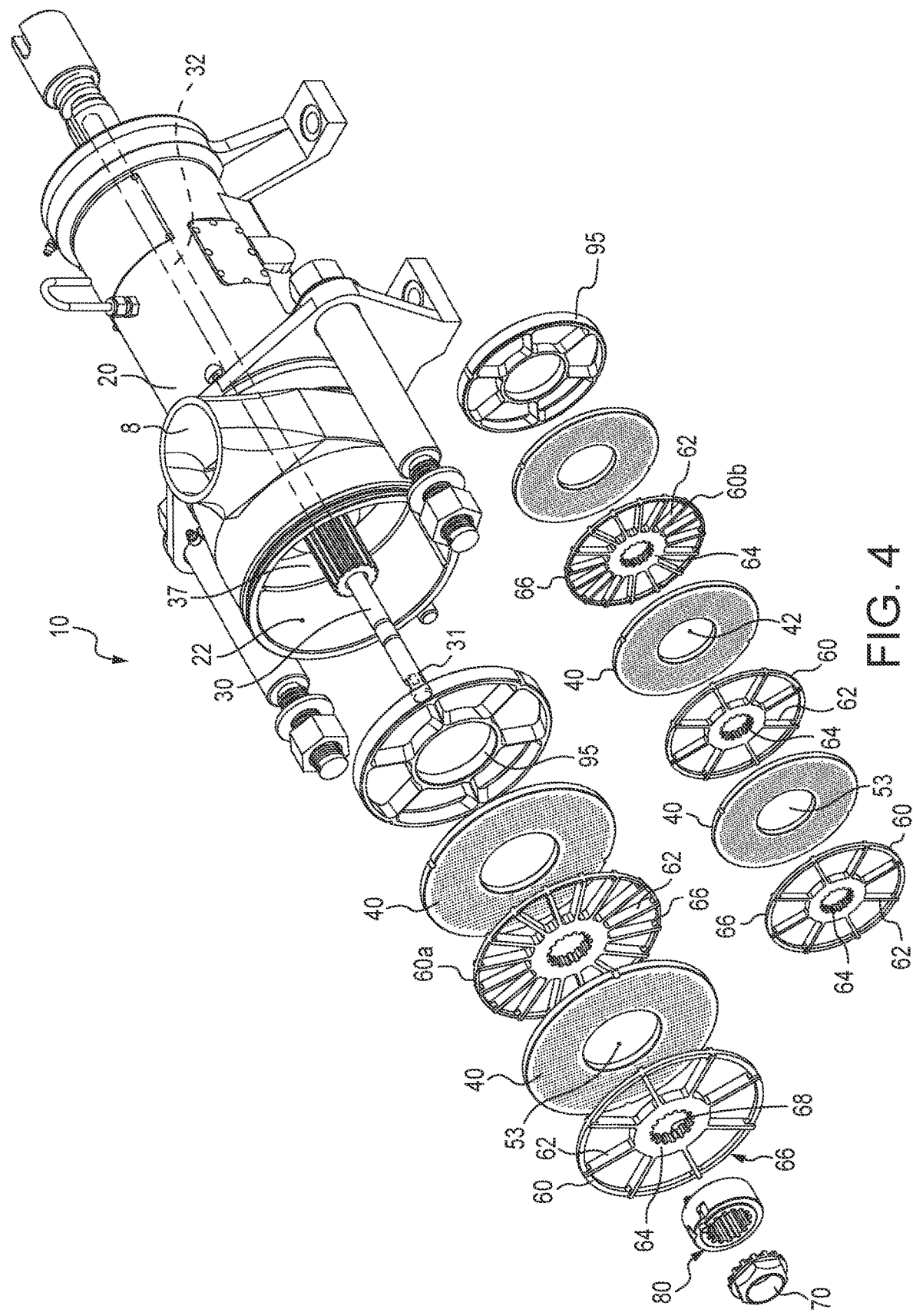
FIG. 4 is an exploded view of the components forming the emulsion device of FIG. 1.
Figure 8:
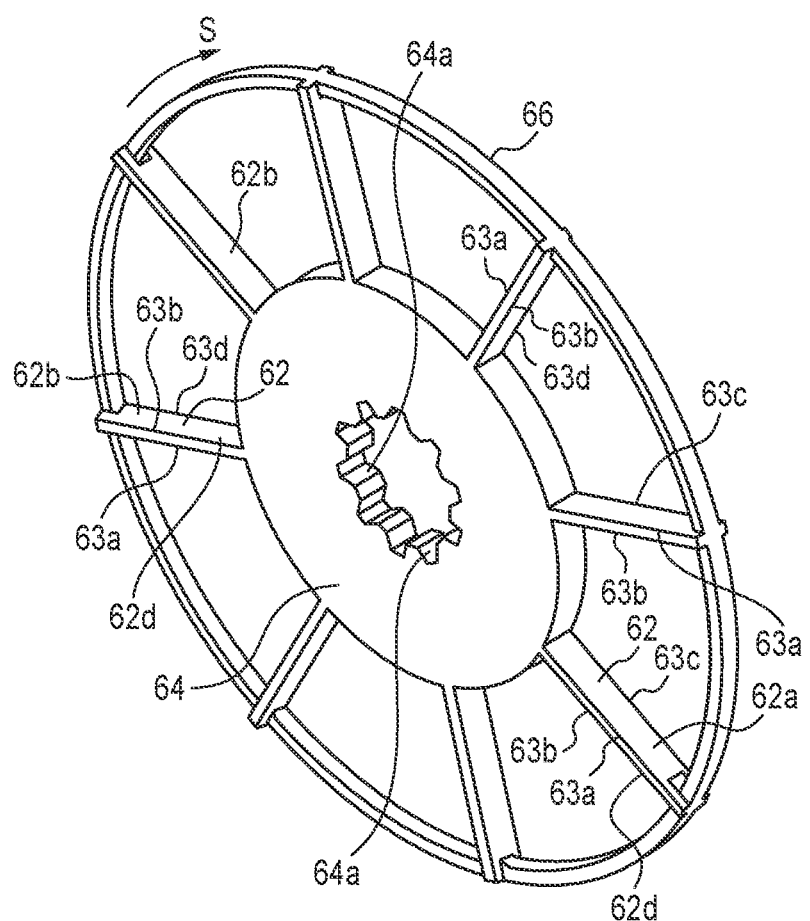
FIG. 8 is a detail view of a cutting assembly.
Figure 9:
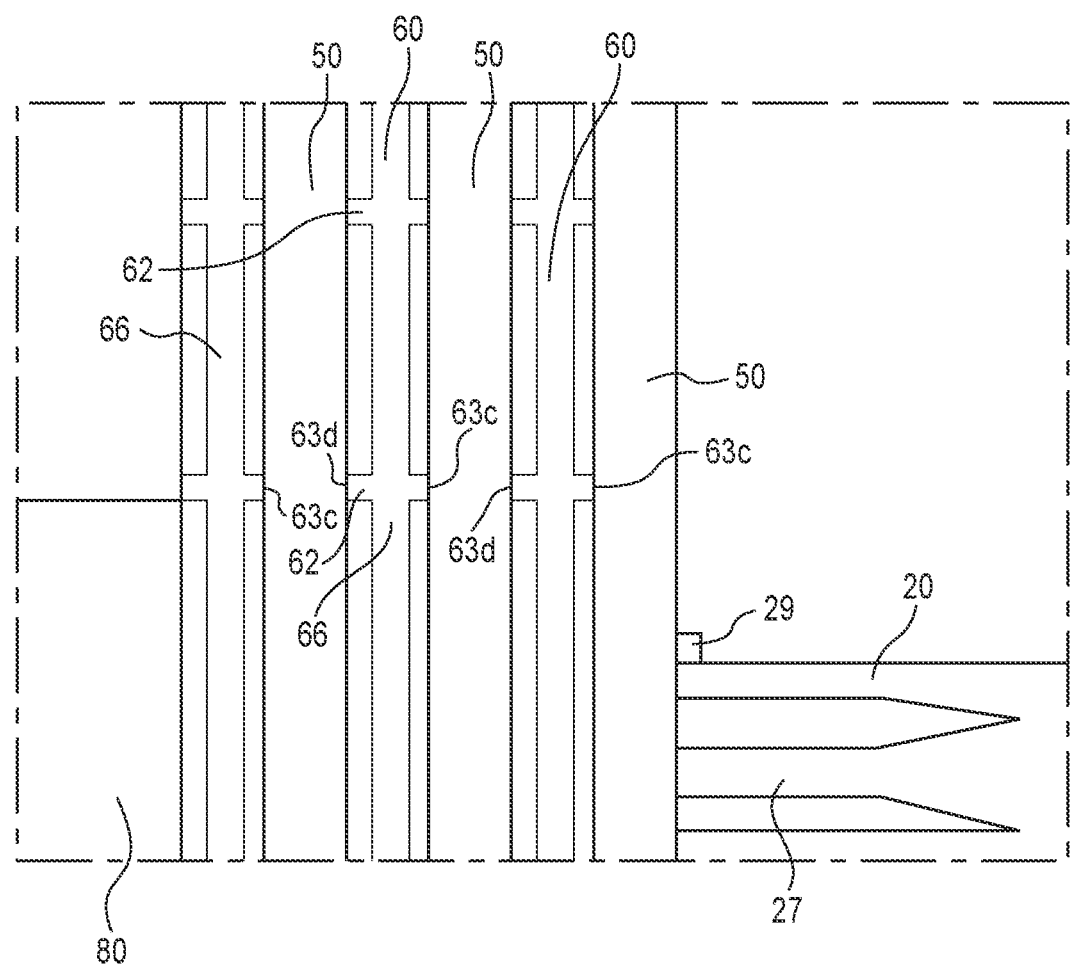
FIG. 9 is a side view of three cutting wheels and three screens disposed upon the shaft with the collar pressed against the first cutting wheel.

The cutting assemblies 60 are best depicted in FIGS. 4, 7, and 8. The cutting assemblies 60 may include a hub 64 that includes a spline that fits upon and a corresponding spline 37 upon the shaft 30, which causes the cutting assemblies 60 to rotate with rotation of the shaft (direction S, FIGS. 12, 13) while allowing the cutting assemblies 60 to longitudinally slide along the shaft 30 in directions toward and away from the distal end 31 of the shaft 30. Each cutting assembly 60 may longitudinally slide with respect to the shaft 30 independently of the other cutting assemblies 60 and independently of the screens 50 (and likewise, each screen 50 may slide along the shaft 30 independently of each cutting assembly 60 and each screen 50). As discussed below, the relative position of the cutting assemblies 60 upon the shaft 30 (and the screen 50 upon the shaft 30) is controlled by the position of the collar 80 upon the shaft 30.

Each cutting assembly includes a hub 64, a plurality of cutting elements 62 that extend radially outward from the hub 64, and in some embodiments, a hoop 66 that receives and supports each of the plurality of cutting elements 62. In some embodiments, the cutting assembly 60 may be monolithically formed from the same initial workpiece, while in other embodiments, the cutting assembly 60 may be assembled together, such as to fix the cutting elements 62 to extend radially from the hub 64 and with the hoop 66 to engage each cutting element 62 into position.

The cutting assembly 60 may include differing numbers of cutting elements, such as eight elements (FIG. 8), sixteen elements (FIG. 7), twenty elements, or in other embodiments within a range of within eight and twenty four elements including the end points of this range. The cutting elements are preferably disposed at consistent angular spacing from neighboring elements 62 along the perimeter of the hub 64, while the cutting elements could be disposed within a pattern of differing spaces, such as a first angular spacing between two adjacent cutting elements 62 and then double or half again the first angle spacing with the next cutting element and then back to the first angular spacing with the next cutting element. In some embodiments, all cutting assemblies within an assembly may be the same, while in other embodiments, second and/or third cutting assemblies within an assembly (in the order that a food product would interact with the cutting assembly 60) may include more and closer spaced cutting elements 62 than the first cutting assembly (and the third may include more cutting elements 62 than the second cutting assembly 60.

The hub 64 of the cutting assembly 60 may include a spline 64a that is configured to receive torque from the shaft 30 and therefore rotate with the shaft 30.

Figure 10:
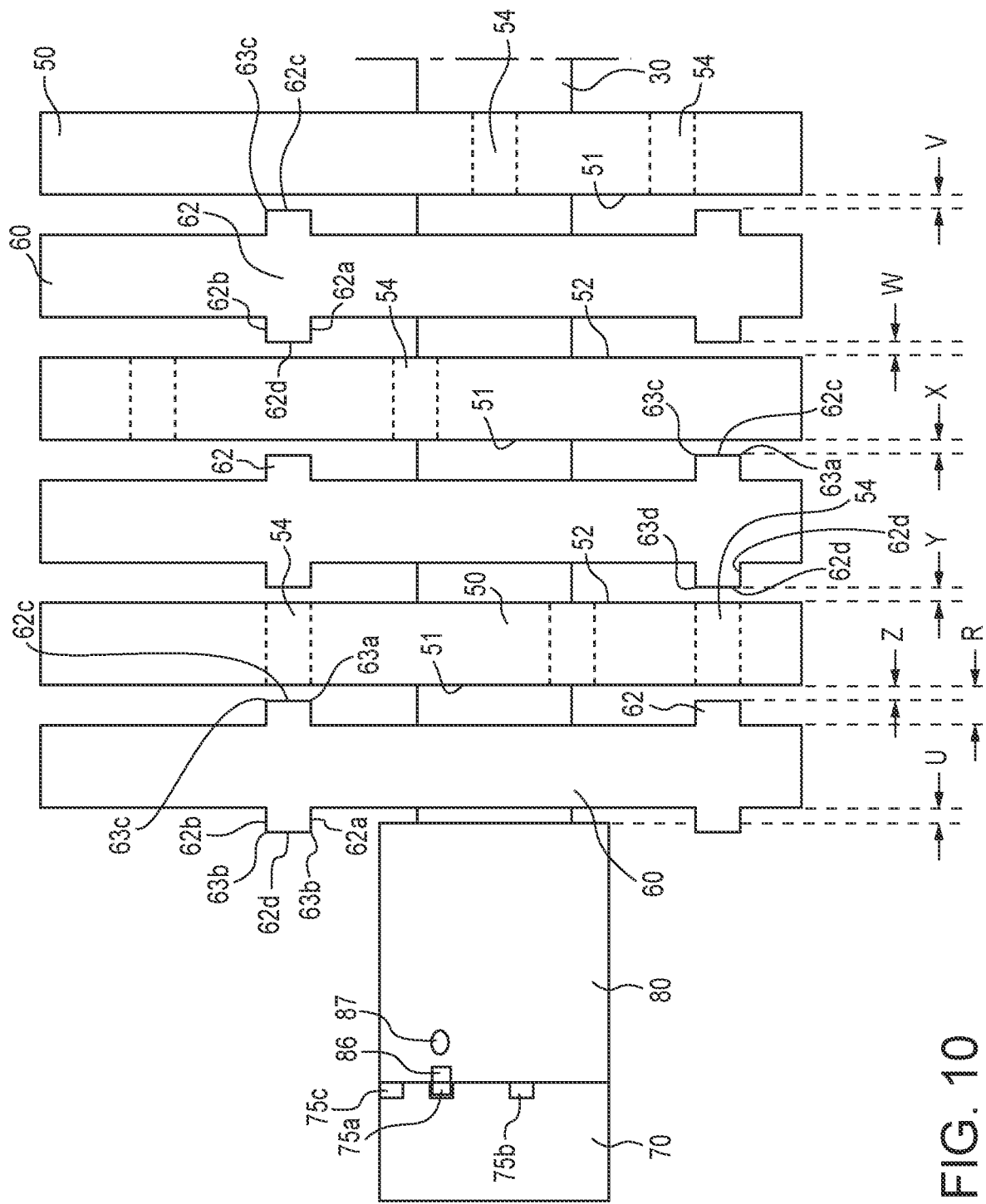
FIG. 10 is another side view of the three cutting wheels and three screens of FIG. 9 depicting the collar backed off of the first cutting wheel by a distance u, allowing the adjacent cutting wheels and screens to be spaced apart at distances z, y, x, w, and v.
Figure 11:
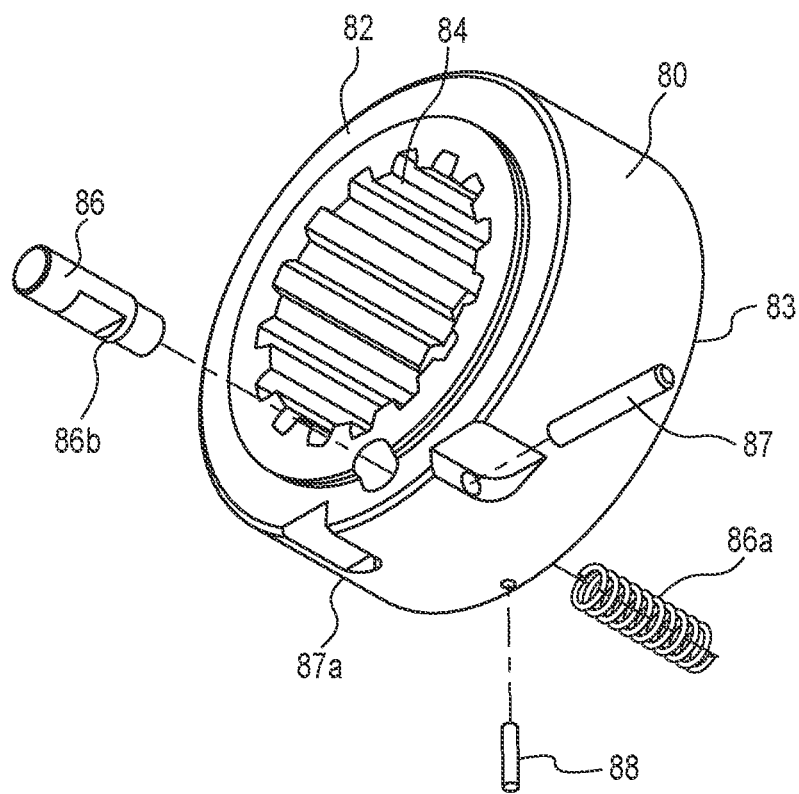
FIG. 11 is a detailed perspective view of the collar, with the pin and the components to bias the pin outwardly from a second surface of the collar exploded therefrom.

The cutting elements 62 are best shown in FIGS. 8 and 10. In some embodiments, the cutting elements 62 extend outward in one or both directions past the extent of the hoop 66, when provided, such that when a cutting assembly 60 is disposed on contact with a screen 50, an end surface 62c, 62d of the cutting element contacts the respective first or second surface 51, 52 of the screen 50 and the hoop 66 is disposed a distance away from the screen 50, as depicted by distance R in FIG. 10. It can be understood that if the cutting assembly 60 is disposed with respect to the screen 50 such that the end surface of the cutting element 62 contacts the surface of the screen, the distance R will be smaller than schematically depicted in FIG. 10, but the hoop 66 will still be maintained with a gap from the adjacent surface 51, 52 of the screen 50. As can be use, the cutting elements 62 tend to wear during use, causing the operator to need to disassemble the device 10 periodically to grind the surfaces of the cutting elements 62, which decreases the distance R of the cutting assembly 60.

The each cutting element includes first and second side surfaces 62a, 62b, and first and second end surfaces 62c, 62d. In some embodiments, each of the first and second side surfaces 62a, 62b are parallel to each other, each of the first and second end surfaces 62c, 62d are parallel to each other, and in some embodiments each of the side surfaces 62a, 62b are aligned to be substantially perpendicular with each of the first and second end surfaces 62c, 62d. The term substantially perpendicular is defined herein as perpendicular plus or minus 2.5 degrees, inclusive of the end points of this range as well as all angles within the range. The first side surface 62a contacts the first end surface 62c to define a first edge 63a, the first side surface 62a contacts the second end surface 62d to define the second edge 63b, the second side surface 62b contacts the first end surface 62c at the third edge 63c, and the second side surface 62b contacts the second end surface 62d at the fourth edge 63d.

As will be understood, as manufactured, the relative angles between the adjacent surfaces of each cutting element 60 may be, for example exactly perpendicular or substantially perpendicular, with wear of the end surfaces 62c, 62d and the edges 63a, b, c, d, the relative angle between adjacent surfaces may be altered. The user may disassemble the device 10 to grind or otherwise machine the wear surfaces to re-establish the desired angle between adjacent surfaces upon the cutting element 62, or alternatively, to make a uniform first and or second end surface 62c, 62d for all of the cutting elements 62 upon the cutting assembly 60 for consistent cutting of food products adjacent to the surface of the screen 50 regardless of the angular position of the cutting assembly 60 with respect to the screen 50, and to establish a uniform and very close proximity (when properly aligned) between the end surfaces 62c, 62d of the cutting elements 62 and the respective facing end surfaces 51, 52 of the screens 50. The term very close proximity is defined to be within a range of 0.000 to 0.010 inches, or in some embodiments 0.000 inches to 0.003 inches, and in some embodiments 0.003 inches thereby to align the end surfaces and the face of the cutting element 62 and the screen without intended direct contact between adjacent screens and cutting assemblies (e.g. before any contact that may develop through wear during use). In some embodiments, the end surfaces of the cutting elements and the end facing surfaces of the screens may be in contact.

In other embodiments, the distance between the end surfaces of the cutting elements 62 and the face of the screen 50 may differ to other distances that are preferred to allow for smooth shearing of food products, such as a food product B/C that is partially extending through a hole 54 in a screen as leading edge 63a, 63b of the cutting element 62 rotates past the hole—such as between 0.003 and 0.02 inches, inclusive of all distances within this range. As discussed below, the device 10 includes a convenient design to allow for disassembly of the cutting assemblies 60 and screens 50 from the shaft 30 as well as quick reinstallation and easily setting the spacing between the cutting elements 62 of the cutting assembly 60 and the facing surface 51, 52 of the screen (as shown schematically in FIG. 10).

In some embodiments, the end surfaces 62c, 62d of the cutting elements 62 may be formed with a width that is substantially the same (an in some embodiments the same as) the diameter of the holes 54 within the screen 50 that is adjacent to the cutting assembly 60. In one preferred embodiment, the end surfaces 62c, 62d and the diameter of the holes 54 may be about 0.125 inches. In other embodiments, the width/diameter may be within a range of about 0.100 to 0.200 inches inclusive of all dimensions within this range and inclusive of the end points of the range. The term "about" is specifically defined herein to include a range that includes the reference value and plus or minus 5% of the reference value. The term "substantially the same" is satisfied when the width of the end surfaces of the holes are both within the above range. In embodiments where the holes 54 within the screen are not round, the dimensions listed above refer to a major dimension of the hole (such as a width of a rectangular or square hole, or a median cross-sectional distance of a curved, but not round, or an arbitrarily shaped hole).

The collar 80 is best shown in FIGS. 4-6 and 11. The collar 80 includes a spline 84 that slides upon the spline 37 in the shaft 30 to allow the collar 80 to rotate with the shaft 30 but be longitudinally slidable along the shaft 30. The collar includes a second surface 82 that when assembled faces the distal end 31 of the shaft and away from the cutting assembly 60 and an opposite first surface 83 that faces the cutting assembly 60. The collar 80 may support a pin 86 that is biased outwardly past the second surface 82 of the collar 80 into a first position in a cantilevered fashion. The pin 86 may be biased by a spring 86a that bears against an inner surface of a blind hole within the collar 80. An operator 87 may extend from the collar 80 that when manipulated, such as pressed, may urge the pin away from the first position and toward a second position where the pin is withdrawn within the collar 80. The operator 87 may be a shaft that rides within a slot 86b in the pin 86, wherein movement of the operator 87 causes the pin to slide toward the second position, and when the operator 87 is released the spring 86a urges the pin 86 to the first position. In one embodiment, depressing the operator 87 causes the pin 86 to withdraw from the first position and withdrawn the pin 86 to the second position within the collar. One of ordinary skill in the art will readily comprehend other mechanical or electromechanical technologies that may cause the operator 87 to cause the pin 86 to withdraw within the collar, such as based upon a magnetic force between the pin and operator 86 with movement of the operator 87 causing motion of the pin 86.

The nut 70 may be provided and threadably mounted upon a threaded portion of the shaft 30 proximate to the distal end 31. The nut when installed may contact the second surface 82 of the collar 80, and the collar 80 is disposed upon the shaft such that upon contact between the nut 70 and the collar 80 and then further rotation of the nut 70 in a direction to slide the nut 70 toward the cutting assemblies 60 urges the collar 80 to slide upon the shaft 30 in the same direction.

The nut 70 may include a plurality of flats 79 thereon to allow the nut 70 to be rotated with a wrench or similar tool, such as an operator 79 with a handle and corresponding flats 79a, as depicted in FIG. 1.

The nut proximate to its second surface (i.e. the surface that faces the collar 80 when installed) may include a plurality of detents 75 disposed upon an outer edge or an end surface thereof, which are configured, when aligned in registry with the pin 86 (in the first position) accepts the pin 86 within a detent 75 to prevent the nut 70 from rotating about the shaft 30 (due to the collar 80 being prevented from rotating with the splined connection 84/37. The engagement of the pin 86 within the detent 75 fixes the position of the nut 70 upon the shaft 30 and therefore establishes maximum spacing between the first surface 83 of the collar and the screen 50 or cutting assembly 60 furthest away from the collar 80. In some embodiments, the shaft may include a stand-off 29 that establishes the proximal-most position of the final screen or cutting assembly 50, 60 in the direction that food products generally flow through the device 10.

In a preferred embodiment, the nut 70 includes a plurality of detents 75 that are disposed at consistent angular spacing around the perimeter of the nut 70. In an exemplary embodiment, the nut includes 15 detents that are each spaced at 24 degree intervals around the perimeter of the nut 70.

As one of ordinary skill in the art will readily appreciate after a thorough review of this specification, the amount of linear motion of the nut 70 per rotation between adjacent detents 75 can be readily optimized or understood with a selection of the desired number of detents 75 and the pitch of the threading of the nut 70 and the shaft 30. For example in a preferred embodiment, the nut 70 may include 15 evenly spaced detents around the perimeter of the nut and the threads may be 20 thread per inch to allow for the nut to longitudinally move 0.003 inches as the nut 70 is rotated to change the alignment with respect to a specific position upon the shaft (E, shown schematically in FIG. 6) or with respect to the pin 86 upon the collar 80. In other embodiments, the threads may be altered to include a different pitch and/or the number of detents 75 provided upon the nut 70 may be modified to allow for linear motion within a range of about 0.002 to 0.006 inches as the nut 70 is rotated between alignment with a spot E upon the shaft or with the pin 86 and adjacent recesses 75.

In some embodiments, the shaft 30, collar 80, nut 70, cutting assemblies 60, and screens 50 are configures as follows. The cutting assemblies and screens 60, 50 are arranged in alternating order upon the shaft 30 with a cutting assembly 60 normally first in a direction of food product travel, and are initially slid onto the shaft from the distal end 31 and down the shaft/spline 37 until the proximal-most component reaches the stand-off 29 when provided. The collar 80 is then threaded upon the shaft 30 and spline 37 until the first surface 81 contacts the hub 64 of the first cutting assembly 60. The nut 70 is then threaded onto the shaft 30 into a position where the nut 70 contacts the second surface 82 of the collar 80. In this position there is no space between adjacent cutting elements 62 and screens 50. The nut 70 is then rotated in the opposite rotational direction an angular distance equivalent to one, two, or three detents (or percentage of final angular distance when the detent 75 and the pin 86 were not aligned in the contacting arrangement)m which slides the nut a distance corresponding to one, two, or three (plus or minus the percentage as discussed above) away from the collar 80 until the pin 86 extends within a detent 75, which prevents rotation of the nut 70 upon the shaft 30. This motion of the nut 70 away from the collar 80 allows the collar to be moved away from the first cutting assembly 60, and with initial rotation of the shaft will cause the total distance that the nut moved to establish a space between the cutting edges 62c, 62d and the facing surface 51, 52 of the screens, as depicted in FIG. 10 as distances u, v, w, x, y, and z. With initial rotation if there is contact, the contact urges the cutting assemblies 60 and screens 50 to slide along the shaft 30 to establish these distances. During the use, the components may further slide upon the shaft due to uneven wear of the components causing localized contact, which urges further sliding.

Figure 12:
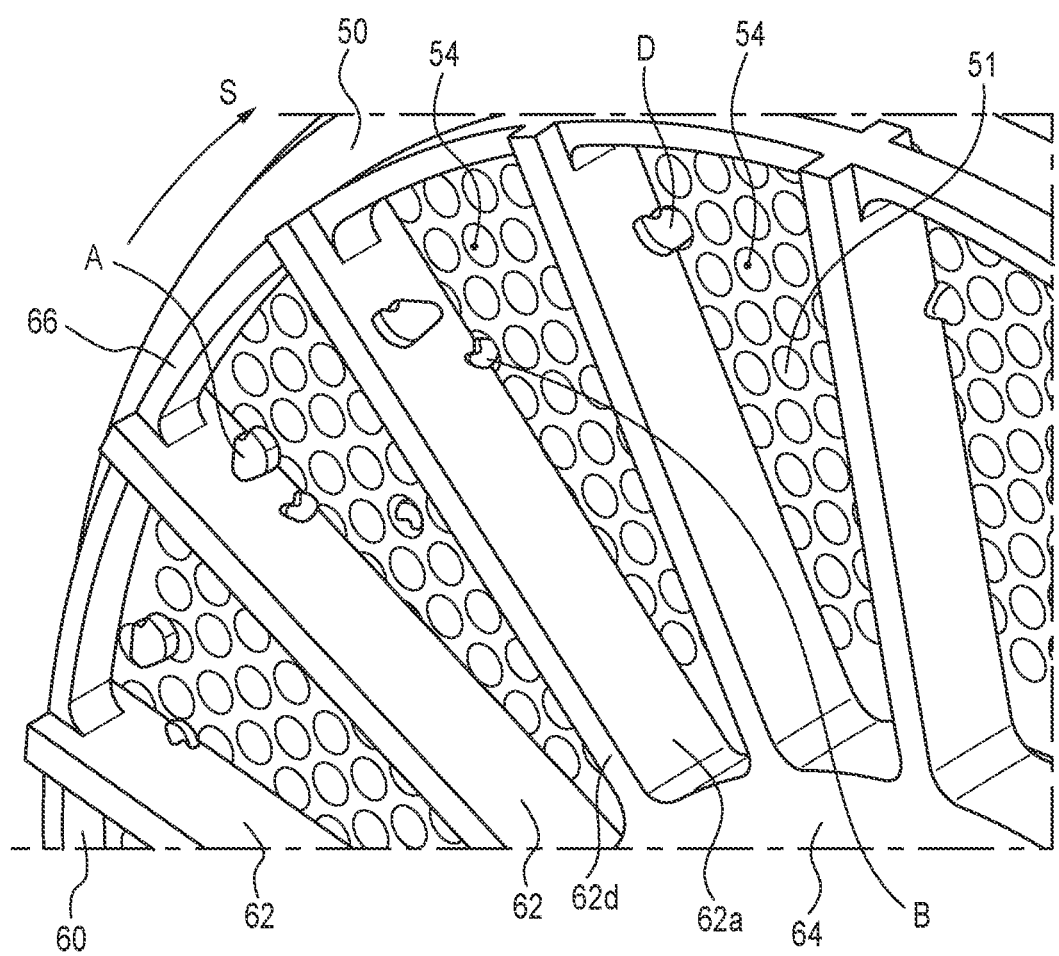
FIG. 12 is a schematic perspective view of the first cutting wheel and first screen, depicting large food portions A approaching the screen and food portions B partially extending through an aperture in the screen and being cut by a first edge of a cutting element.
Figure 13:
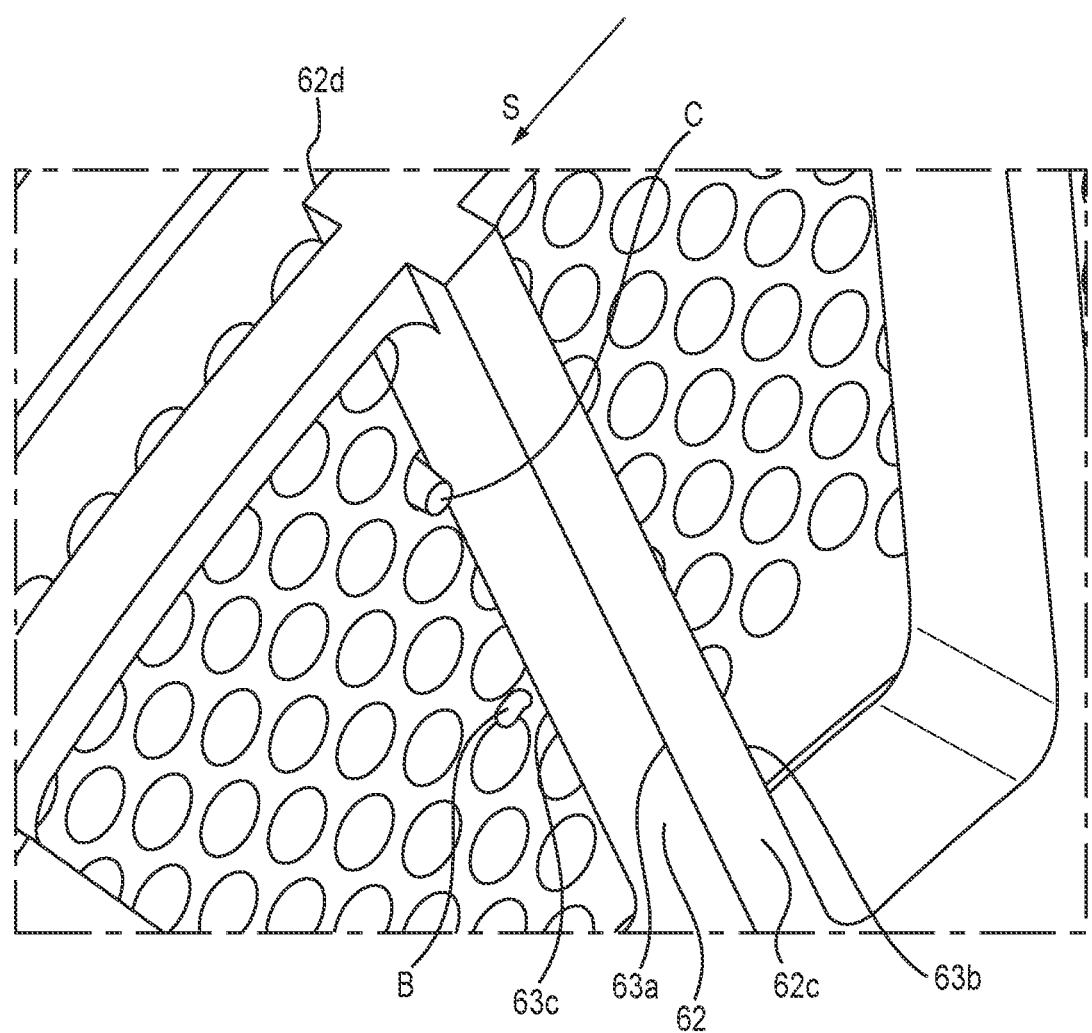
FIG. 13 is a schematic perspective view of the first screen and a second cutting wheel, depicting a food portion C extending through the aperture in the first screen and being cut by a second edge of the a cutting element of the second cutting assembly.

The operation of the device 10 is schematically depicted in FIGS. 12 and 13. In FIG. 12, relatively large food particles A (which maybe food, bone—in pet food uses—or a combination of both, approach the screen due to the vacuum force applied to the outlet 8 of the housing, or the pumping force, which urges food particles through the cutting assemblies 60 and screens 50. The side surfaces 62a, 62b of the cutting element (62a in FIG. 10) tend to align these large particles A in a direction where a narrower dimension of the particle A approaches a hole 54 in the screen 50. As the food particle approaches the hole 54 a portion of the food particle may extend through the hole 54 as depicted in B. The cutting element 62 (rotating in direction S) approaches the food particle B, and due tends to shear the food particle to a smaller particle D, which then urged toward another hole 54 and then sheared again until the food particle is small enough to fit through the hole 54.

FIG. 13 depicts the opposite surface 52 of the screen and the second cutting assembly, where the second end 62b faces the screen 50. As depicted by C, a food particle partially extends through the hole 54 and is sheared by an approaching cutting element 62 that rotates in the direct S—with the second edge 63b shearing the food particle. These again smaller food particles are aligned along the side surface 62a thereby aligning the food particle with the hole 54 in the second screen, and potentially shearing the particle again at the interface between the first edge 63a of the second cutting element and the second screen 50 and again with the third cutting element and the third screen, as discussed above.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

We claim:

1. A method of assembling an emulsification system is provided, the method comprises the steps of:

placing a plurality of screens and a plurality of cutting assemblies upon a shaft and within a housing, wherein the plurality of screens and the plurality of cutting assemblies are disposed upon the shaft such that each screen of the plurality of screens alternates with each cutting assembly of the plurality of cutting assembly, wherein a first cutting assembly is disposed upon a shaft such that it is closest to a distal end of the shaft, wherein the plurality of screens are each fixed with respect to the housing such that the screens do not rotate with rotation of the shaft, and wherein the plurality of cutting assemblies are fixed to the shaft such the cutting assemblies rotate with rotation of the shaft and with respect to the plurality of screens, wherein the plurality of screens and plurality of cutting assemblies are each longitudinally movable along the shaft, wherein each of the plurality of cutting assemblies include a central hub, a plurality of cutting elements that extend radially outward from the hub and are spaced with a consistent angular spacing from adjacent cutting elements around the a perimeter of the hub, and wherein the screen includes opposite first and second side surfaces and a plurality of holes that extend therethrough, wherein each of the cutting elements comprise first and second parallel side surfaces and first and second parallel end surfaces, wherein edges are formed where each of the first and second side surfaces meet the first and second end surfaces, wherein each of the edges are substantially perpendicular between the respective side and end surface defining the edge;

placing a collar upon the shaft and in proximity to a hub of the first cutting assembly, rotating a nut upon a threaded portion at the distal end of the shaft in a first direction until an end surface of the nut contacts a second end surface of the collar, continuing to thread the nut in the first direction to slide the collar until a first surface of the collar opposite from the second surface contacts the hub of the first cutting assembly, and continuing to thread the nut in the first direction until further rotation is prevented, wherein a side surface of one or more of the cutting elements upon each cutting assembly contacts the respective first or second side surface of the screen that faces the respective cutting assembly, rotating the nut in a second direction opposite to the first direction a distance to back the nut away from the second surface a distance between about 0.003 and 0.017 inches from the second surface of the collar.

2. The method of claim 1, wherein the nut comprises a plurality of detents disposed around a perimeter of the nut with consistent spacing between adjacent detents, and wherein the collar includes a pin that is biased to a first position where the pin extends outwardly beyond the second surface of the collar, wherein the step of rotating the nut in the second direction comprises the step of rotating the nut until the pin is in registry with a first detent of the plurality of detents to extend within the first detent such that the nut is prevented from rotating upon the shaft.

3. The method of claim 2, wherein the step of rotating the nut in the second direction further comprises rotating the nut in the second direction past the first detent and further rotating the nut in the second direction until the pin is in registry with a second detent of the plurality of detent such and allowing the pin to extend within the second detent such that the nut is prevented from rotating upon the shaft.

4. The method of claim 2, wherein the collar comprises an operator that is manipulable to move the pin away from the first position and to a second position where the pin no longer extends past the second surface of the collar, wherein the operator is manipulated to withdrawn the pin from the first position before the nut is rotated in the second direction and then releasing the operator when the pin is in registry with a desired detent of the plurality of detents.

\* \* \* \* \*